(12) United States Patent  (10) Patent No.: US 8,275,227 B2
Thurlow et al.  (45) Date of Patent: Sep. 25, 2012

(54) CABLE INSTALLATION

(75) Inventors: Adrian R Thurlow, Stowmarket (GB); Ian Neild, Ipswich (GB)

(73) Assignee: British Telecommunications plc, London (GB)

( * ) Notice: Subject to any disclaimer, the term of this patent is extended or adjusted under 35 U.S.C. 154(b) by 0 days.

(21) Appl. No.: 12/281,384

(22) PCT Filed: Feb. 16, 2007

(86) PCT No.: PCT/GB2007/000455
§ 371 (c)(1),
(2), (4) Date: Sep. 2, 2008

(87) PCT Pub. No.: WO2007/104910
PCT Pub. Date: Sep. 20, 2007

(65) Prior Publication Data
US 2009/0010606 A1  Jan. 8, 2009

(30) Foreign Application Priority Data
Mar. 10, 2006 (EP) ...................................... 06251287

(51) Int. Cl.
*G02B 6/50* (2006.01)
*H02G 1/08* (2006.01)
(52) U.S. Cl. .................. 385/134; 385/139; 254/134.3 R

(58) Field of Classification Search .................... 385/134
See application file for complete search history.

(56) References Cited

U.S. PATENT DOCUMENTS

| 4,948,219 A * | 8/1990 | Seino et al. ..................... 385/95 |
| 5,121,644 A | 6/1992 | Grey et al. |
| 5,248,128 A | 9/1993 | Warren et al. |

FOREIGN PATENT DOCUMENTS
JP  2000-217216  8/2000

OTHER PUBLICATIONS

International Search Report for PCT/GB2007/000455, mailed Mar. 28, 2007.

* cited by examiner

*Primary Examiner* — Omar Rojas
(74) *Attorney, Agent, or Firm* — Nixon & Vanderhye PC

(57) ABSTRACT

A method for use in connection with installing a fiber unit into a conduit having a first end and a second end, the method being suitable to detect when the fiber unit introduced into the first end arrives at the second end. The fiber unit is introduced into the conduit from the first end and installed towards the second end; introducing a light with a light source into the fiber unit at the first end; detecting reflected light in the fiber unit with a light detector at the first end, and detecting changes in the reflected light, whereby an operator may determine that the fiber unit has arrived at the second end.

10 Claims, 4 Drawing Sheets

CABLE INSTALLATION

This application is the U.S. national phase of International Application No. PCT/GB2007/000455 filed 16 Feb. 2007 which designated the U.S. and claims priority to EP 06251287.6 filed 10 Mar. 2006, the entire contents of each of which are hereby incorporated by reference.

BACKGROUND

1. Technical Field

The present invention relates to the installation of cables, such as optical fibre units, wires, electrical cables or the like. More specifically, but not exclusively, the present invention relates to the blowing of fibre unit cables through pre-laid conduits.

2. Related Art

Optical fibres are widely used within telecommunication systems for high-speed information transfer. A fibre unit, which could comprise a single optical fibre, or a bundle of optical fibres, is commonly installed into a protective optical conduit comprising optical fibre tubes, which have already been laid along the desired route, usually as a continuous span between convenient access points such as surface boxes or inspection chambers.

The conduits typically are made of plastic, each with a typical inner diameter of 3 to 6 mm or more, and are usually provided in a bundle comprising up to 24 or more tubes, which are held together within a protective outer sheath. Each fibre conduit tube can receive at least one fibre unit comprising one or more individual optical fibres. Large numbers of conduits—and bundles of conduits—are pre-installed across the access network and the distribution network between the local exchanges and the customer premises in a branching network system. With the advent of fibre to the premises (FTTP), the conduits will further extend to and into commercial and residential premises. Indeed it is a fundamental part of the push to FTTP in e.g. the UK that substantially all the network comprises optical fibre, extending from the core network to as many end customers as possible. To achieve this, optical fibre installation needs to be speedy, cost- and effort-efficient.

In the vast majority of cases, a dedicated path is described between two points with a single length of conduit tube. In an exceptional case, the conduit path may comprise a number of lengths of physically separate conduit tubes which are connecterised together in series with tube connectors. Choosing the correct conduit tube at the installation should in the normal case, result in the fibre unit emerging at the other end.

Problems however may arise which result in the fibre unit not reaching the correct destination. During installation, the operator is usually presented with a large number of conduit tubes, which could result in a mistake in identifying the correct conduit, especially if the operator is working in adverse conditions down a manhole or in poor lighting. This may be so even where conduits are coloured coded which helps to direct the operator to the correct conduit.

There is also the possibility that a conduit route is wrongly mapped in the records used by the operator so that one end of the conduit does not lead to the correct destination. Where the path comprises a number of tube lengths connectorised together in series, yet another problem may lie in broken connections between lengths of conduit tubes within the network, so that the fibre unit may get lost within the system during installation and never emerge at the destination. Yet another issue may be the possibility that the fibre unit, during installation, could be impeded by an imperfect connector or a tight bend or some other source of friction in the conduit, and again never emerge at the destination.

For any of these or other reasons, the fibre unit will emerge in the wrong place, or not at all. Add to that some uncertainty about the exact length of the conduit route down which the fibre unit is being installed, so that the operator cannot even accurately know in a timely manner when something has gone wrong.

One method of installing fibre units into the conduits is by pulling them through the conduits. However, the tension induced can cause damage to the fibre units and impair their operating performance. A known alternative method is the "blown fibre" technique whereby a compressed fluid such as compressed air is used to convey, or "blow", a fibre unit along a conduit from one end.

Currently, installing fibre units using the blown fibre method requires at least two operators: one situated at the head end of the conduit, where during installation air and the fibre unit is installed into the mouth of the conduit, and one at the remote end of the conduit, where air and the fibre unit emerges from the mouth of the conduit. The second remote end operator is required because the remote end is often some distance away—up to a kilometer or more—from the head end. The operator at the head end is therefore unable to know the status of the remote end during an installation without a second operator located there.

The head end operator monitors and operates a fibre installation mechanism—known in the art as a "blowing head"—that feeds the optical fibre into the conduit and controls the supply of compressed air. He starts the process by directing air into the mouth of the head end conduit. If the air is directed into the correct conduit, the remote end operator will sense the arrival of the air with an air flow meter temporarily connected to the end of the conduit, or more simply by feeling the air flow exiting the conduit against his hand if the air flow is sufficiently high. He then communicates this to the head end operator by radio or other means, to confirm to the head end operator that he is applying air to the correct conduit. The head end operator then introduces the fibre unit into the conduit and blows it through to the remote end of the conduit, whereupon the remote end operator advises his colleague on its arrival. The head end operator then turns off the air supply and the blowing head, and the process is complete.

This process is labour-intensive as a minimum of two operators must work on a single installation. The head end operator needs to be skilled in the operation of the blowing head, while the remote end operator is required to alert his colleague to the status of the installation at the remote end.

Methods whereby a single operator at the head end of a conduit can detect the arrival of an optical fibre at the remote end of the conduit are known.

In the simplest method, the length of the conduit route is known, allowing the operator to know that the fibre has (probably) arrived at the remote end when the required length of fibre unit has been played out. This relies on the map record of conduit route being up to date and accurate, and presumes a completely smooth and obstruction-free conduit route. Neither of these can be guaranteed in practice.

Another known practice is to install at the remote end of the conduit a barrier of porous material such as an "airstone" which is placed at the remote end of the conduit, which will allow air through but which will stop further progress of the fibre unit. This cease in progress is detected by the blowing head which then stops further ingress. However even when the progress of the fibre has ceased, the operator at the head end cannot be certain that the fibre unit has reached the porous barrier at the end of the conduit, or if instead the fibre unit is caught on an obstruction at some point along the length of the conduit.

As described in WO9103756, a solution is to position a light source at the remote end of the conduit and a light detector is positioned at the head end. The arrival of the optical fibre at the remote end is indicated by the detection of light by the detector at the head end. One problem with this method is that an early, or "false", indication of the arrival of the optical fibre may occur if stray light is inadvertently introduced into the conduit at a location between the head end and remote end, e.g. at an open inspection chamber. This method also relies on adequate light being coupled into the advancing end of the optical fibre to be detected by the detector, however the coupling process is inefficient and is further degraded in proportion to the length of the optical fibre due to normal attenuation properties, so this method may not be practicable on long lengths of optical fibre. A second method described in this document uses a previously installed optical fibre to create part of a light "circuit" with the blown optical fibre. This method is not suitable for installing the first optical fibre in a conduit. Furthermore, any previously installed fibre units may be carrying live traffic and so would not be available to use for the installation of additional fibres.

Another known method is to use a blowing head such as that described in WO/9812588, which is configured to stop driving the fibre unit when it senses that fibre movement within the conduit is slowing down or stopping owing to an obstruction. When used in conjunction with a sealed-off remote end, the fibre unit would stop moving when it reaches the destination end. However, as the sealed-off end is just one type of obstruction the fibre unit may encounter on the conduit route, this method fails to positively identify when the fibre unit has reached and emerged from the conduit at the remote end without travelling to the remote end for a visual inspection.

BRIEF SUMMARY

Accordingly, in a general aspect, the present invention provides methods and devices for aspects relating to the installation of cables such as fibre units into conduit tubes, in particular, allowing a single operator to operate substantially on his own to determine if air fed into a conduit is reaching its intended destination, and/or if and when the fibre unit fed into the conduit has reached its destination. The invention can be used where the operator has to choose one of a number of conduits, or where there is a single conduit but where it is desirable to unambiguously confirm that the air and fibre unit reaches the intended destination.

A first aspect of the invention provides a method for use in connection with installing a fibre unit into a conduit having a first end and a second end, the method being suitable to detect when the fibre unit introduced into the first end arrives at the second end, and comprising the steps of:
  introducing the fibre unit into the conduit from the first end and installing it towards the second end;
  introducing light with a light source into the fibre unit at the first end;
  detecting reflected light in the fibre unit caused by reflection of the light on a surface of the fibre unit with a light detector at the first end; and
  detecting changes in the reflected light, whereby an operator may determine that the fibre unit has arrived at the second end.

By using this method, the operator can determine if and when the fibre unit has arrived at the remote end of the conduit. The operator can perform the steps of shining light down the fibre unit and monitoring it for reflected light when he believes that it has arrived at the remote end; alternatively this can be done while the fibre unit is travelling through the conduit tube. A decrease in the amount of reflected light in the fibre unit is indicative of fibre arrival at the remote end.

A second aspect of the invention provides a device for use in connection with installing a fibre unit into a conduit having a first end and a second end, and being suitable to detect when the fibre unit introduced into the first end arrives at the second end,
  the device comprising light dispersing means for dispersing light received via the fibre unit at or proximate to the second end to cause a change in reflected light levels in the fibre unit, so that light detection means located at the first end can detect a change in reflected light levels in the fibre unit.

By using this device, preferably located at the remote end of the conduit tube, the operator can learn when the fibre unit has reached the remote end. Until the fibre unit reaches the device, light introduced in it at the head end travels down the fibre towards the remote end, and is reflected back from the fibre end. When the fibre end reaches device at the remote end, it is embedded into the light dispersion substance, at which point the reflected light in the fibre decreases to indicate to the operator at the head end that the fibre unit has arrived at the remote end.

A third aspect of the invention provides apparatus for use in connection with installing a fibre unit into a conduit having a first end and a second end, and being suitable to detect when the cable introduced into the first end arrives at the second end, the apparatus comprising
  light detection means for detecting reflected light in the fibre unit caused by reflection of the light on a surface of the fibre unit; and
  means for detecting a change in reflected light levels in the fibre unit.

This apparatus is preferably located at the head end of the conduit tube. It allows the operator to monitor the fibre unit for the amount of reflected light present, as well as for changes in the level of such reflected light. In a preferred embodiment, the apparatus can be made integral with the source of light.

A fourth aspect of the invention provides a bead for use for use in connection with installing a fibre unit into a conduit having a first end and a second end, and for use in conjunction with a device as claimed below, the bead comprising a chamber for accommodating the fibre unit, wherein the chamber includes an opening configured to expose an advancing end of the fibre unit to the light dispersing means.

By installing the bead on the fibre unit for installation along the conduit tube, the fibre end can be protected and the end exposed for effective interaction with the light dispersing substance of the device at the remote end.

A fifth aspect of the invention provides a kit for use in connection with installing a cable into a conduit having a first end and a second end, and being suitable to detect when the cable introduced into the first end arrives at the second end, wherein the cable is configured to transmit light introduced into it from the first end to the second end, and to reflect the light from the second end back to the first end, the kit comprising
  a device located at the second end as claimed below; and
  apparatus located at the first end as claimed below.

By using the device and the apparatus together, the operator can learn when the fibre unit has arrived at the remote end of the conduit tube, by shining light down the fibre unit from the head end, and monitoring the light reflected from the remote end until he discerns a drop in the reflected light level resulting from engagement of the fibre end with the light dispersing substance at the remote end. In a preferred embodiment, the kit includes use of the bead configured to expose the fibre end for efficient interaction with the light dispensing substance of the device.

A sixth aspect of the invention provides a method for installing a fibre unit in a conduit having a first end and a second end, comprising the steps of
(i) confirming whether air introduced into the conduit at the first end is flowing out of the conduit from the second end by
substantially blocking the second end, so that when the air is introduced into the conduit its flow from the second end will be impeded;
introducing a flow of air into the first end; and
confirming whether the air is flowing from the second end upon detection of changes in air flow levels within the conduit, and
(ii) detecting the arrival of the fibre unit at the second end using a method as claimed below.

In this method, the operator using the blown fibre technique of installing fibre units into a conduit tube can first determine if he has chosen the correct tube to introduce air into at the head end, by monitoring the status of air flow levels within the conduit. Upon determining that air is flowing to and from the correct remote end, the operator can then introduce the fibre unit into the conduit tube knowing that the fibre will follow the path taken by the air, and then detect the fibre arrival at the remote end by monitoring the reflected light in the fibre unit for changes.

A seventh aspect of the invention provides a device for installing a fibre unit in a conduit having a first end and a second end, comprising
confirmation means for confirming whether air introduced into the conduit at the first end is flowing out of the conduit from the second end, wherein the device is connectable to the conduit, and wherein during use the air flows from the conduit into the device, the confirmation means comprising pressure sensitive means configured to respond to a change in air pressure levels, and
detection means for detecting the arrival of the fibre unit at the second end as claimed below.

By using this device, which is preferably positioned at the remote end of the conduit tube, the operator can determine air flow and fibre arrival at the remote end when the air flow within the tube changes, and then the fibre end engages with the light dispersing substance so that the amount of reflected light in the fibre unit decreases.

A eighth aspect of the invention provides apparatus for installing a fibre unit in a conduit having a first end and a second end, comprising
confirmation means for confirming whether an air flow introduced into the conduit at the first end is flowing out of the conduit from the second end, wherein the confirmation means is connectable to the conduit and comprises sensing means to detect changes in air flow levels and/or air pressure levels within the conduit, and
detection means for detecting the arrival of the fibre unit at the second end as claimed below.

By using this apparatus, which is preferably positioned at the head end of the conduit tube, the operator can determine air flow and fibre arrival at the remote end when the air flow within the tube changes, and then the fibre end engages with the light dispersing substance so that the amount of reflected light in the fibre unit decreases.

A further aspect of the invention provides a kit for installing a fibre unit in a conduit having a first end and a second end, comprising
(i) confirmation means for confirming whether an air flow introduced into the conduit at the first end is flowing out of the conduit from the second end, wherein the confirmation means is connectable to the conduit and comprises
a device located at or proximate to the second end comprising pressure sensitive means configured to respond to a change in air pressure levels, and
apparatus located at or proximate to the first end, comprising sensing means to detect changes in air flow levels and/or air pressure levels within the conduit, and
(ii) detection means for detecting the arrival of the fibre unit at the second end as claimed below.

By using this kit, the operator can determine air flow and fibre arrival at the remote end when the air flow within the tube changes, and then the fibre end engages with the light dispersing substance so that the amount of reflected light in the fibre unit decreases. This embodiment advantageously allows for the fibre unit to be installed immediately after air flow arrival detection at the remote end, without the need for the operator to move from his position at the head end, nor for the air or fibre arrival to be separately signalled to him by means of e.g. a radio transmission, or for there to be a second operator at the remote end.

BRIEF DESCRIPTION OF THE DRAWINGS

Preferred embodiments of the invention will now be described, by way of example only, with reference to the accompanying drawings, in which.

DETAILED DESCRIPTION OF EXEMPLARY EMBODIMENTS

Figure 1A:
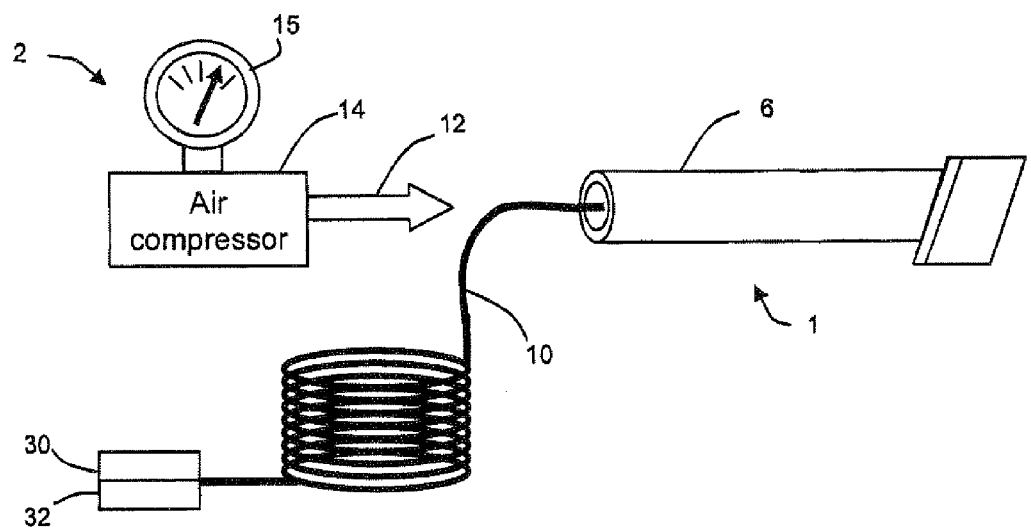
FIGS. 1A and 1B are schematic diagrams showing apparatus according to embodiments of the invention.
Figure 1B:
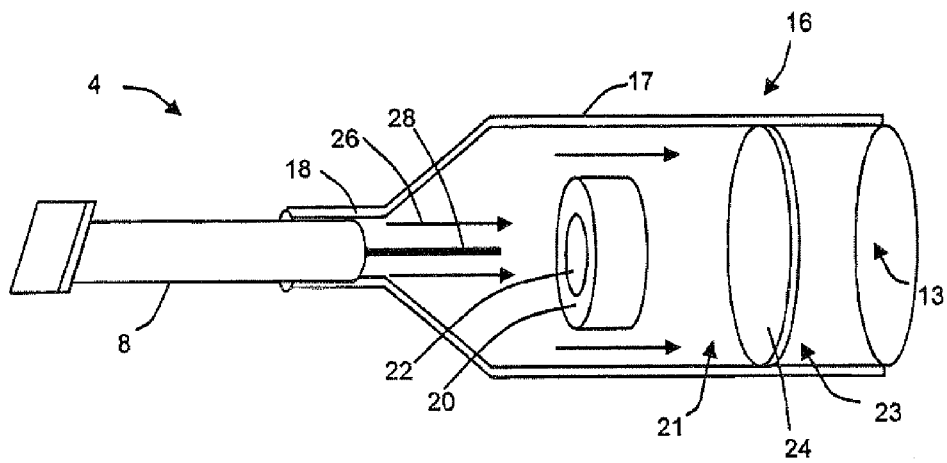

FIGS. 1A and 1B show the basic elements and operating principle of an embodiment of the present invention, where FIG. 1A depicts the apparatus at a first or head end 2 of a conduit 6, and FIG. 1B depicts the second, or remote end 4 of the conduit.

During an installation, the operator first determines that air introduced into the head end of the conduit does flow to the desired remote end, before introducing the optical fibre into the conduit. He turns on the compressor 14 located at the head end, and if all is well (i.e. the operator has chosen the correct conduit, the conduit route is correctly mapped, etc.), the air flows in the direction of arrow 12 through the conduit to the remote end 4 of the conduit as shown in FIG. 1B.

In the embodiment shown in FIG. 1B, the air then flows out of the mouth of the conduit and into a device 16 connected to the conduit. The device 16 according to a preferred embodiment of the invention can be used both to determine that the air is reaching the desired remote end, as well as that air is flowing out from the desired conduit remote end. The operator would determine this, before the fibre unit is fed into the conduit. In a further aspect, the device can also detect when a blown fibre unit 10 has arrived at the remote end 8 of the conduit.

After the operator has determined that air is indeed flowing to the correct remote end, the optical fibre unit 10 is introduced into the head end of the conduit. It is driven along the conduit by a combination of the viscous drag generated by the air flowing along the conduit, and the drive wheels of a blowing head (not shown) as is known in the art. A typical conduit for optical fibres could have an inner diameter of 3 to 6 mm, although other sizes are also commonly used.

In FIG. 1B, the device 16 is shown as being positioned at the mouth of the remote end of the conduit. Although this is a preferred position, the device can be positioned in other places to realise the advantages of the invention, as will be more fully described below.

As shown in FIG. 1B, the device 16 has a housing 17 connected to the remote end of the conduit 8 via a connector 18. In this embodiment, the housing 17 includes a reservoir 20 containing an index-matching fluid 22, and a diaphragm 24.

Figure 2:
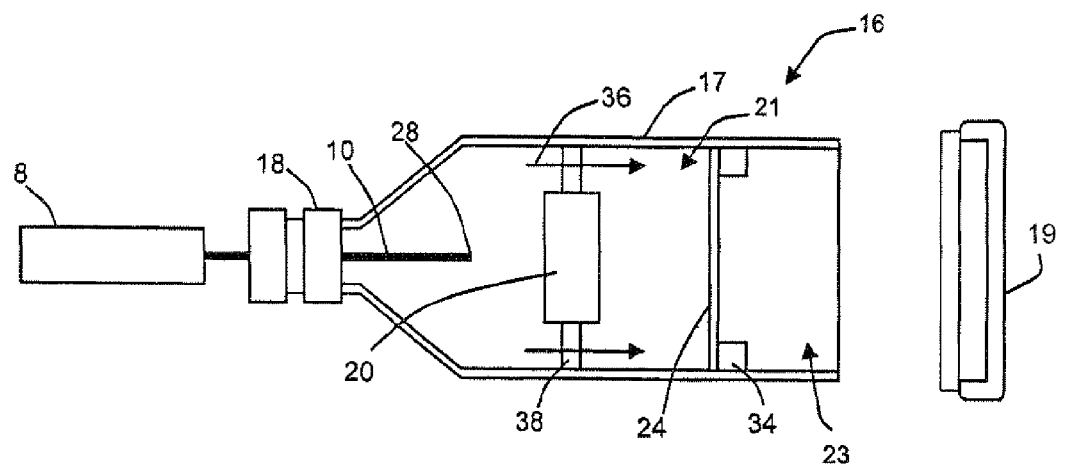
FIG. 2 is a cross-sectional view of a device according to an embodiment of the invention.

FIG. 2 shows the device 16 attached to the remote end of the conduit 8, in cross-section and in more detail. The interior of the housing 17 is protected by a cap 19, which can be removed during use, etc. The diaphragm in this embodiment of the invention is pressure-sensitive and serves as an air-containment member within the housing. Here, the diaphragm comprises a member which, together with the other wall(s) of the housing 17, defines a substantially airtight space 21 into which the air flow 26 originating from the remote end 8, enters. In use, the diaphragm is responsive to an air pressure threshold within the device, and is capable of moving or rupturing to enlarge the space 21 within the housing. The diaphragm is held in place by a support ring 34, which may be either integral to, or mounted on, the inner surface of the housing 17. In order to ensure a good seal between the diaphragm 24 and the inner surface of the housing 17, the periphery of the diaphragm 24 may be rigid in the case where the diaphragm is designed to rupture. This is so that only the central portion will rupture when the pressure threshold is reached.

The reservoir 20 is annular, although it can be any shape to allow the advancing end of a fibre unit 28 to pass through it without damage, after becoming immersed in the index-matching fluid. Alternatively, the reservoir 20 could comprise a closed rear surface which arrests the passage of the fibre unit 10 through the device 16. In either case the action of the index matching fluid 22 contained in the reservoir 20 on the advancing end of the fibre unit 28 is the same. Additionally, the reservoir 20 could have a smaller outer diameter than the inner diameter of the housing 17 to allow an air flow 36 to pass around it easily. It is supported by anchoring means 38, such as spokes, which also do not impede the air flow 36 but are rigid in order to maintain the reservoir 20 centrally within the housing 17. It could include a cover 19 to protect the inside and any contents when the device is not in use.

The housing 17 typically has a cylindrical portion of around 3 cm in diameter and may be formed by a low cost process such as plastic injection moulding. The total length of the housing 17 is typically around 4 or 5 cm, depending on factors such as the outer diameter of the conduit.

Figure 3:
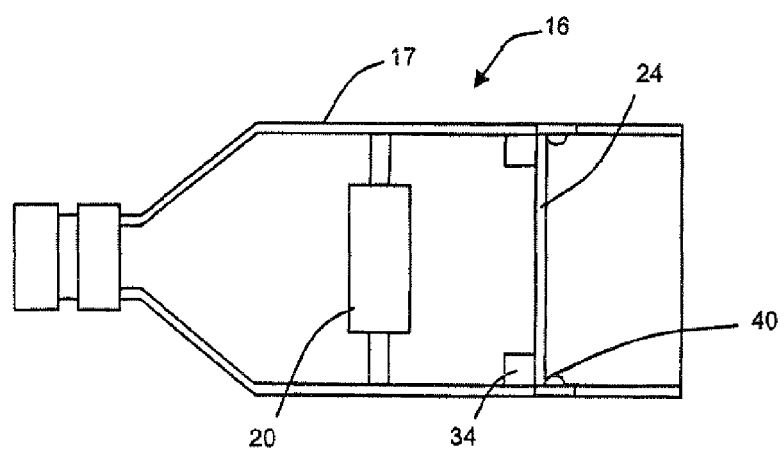
FIGS. 3, 4A and 4B show devices according to further embodiments of the invention.
Figure 4A:
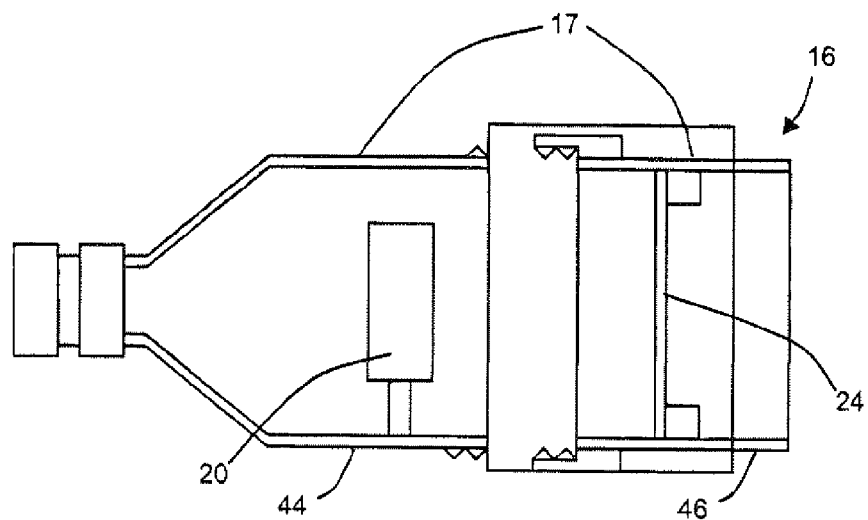
Figure 4B:
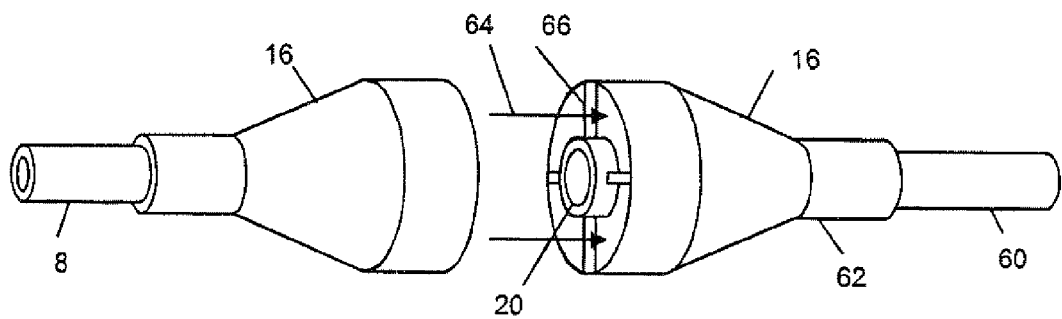

In one embodiment, the device 16 is intended to be disposed of after one use. In such a case, the diaphragm is preferably installed during the manufacture of the device. Alternatively, as illustrated in FIGS. 3, 4A and 4B, the device may be reusable in the case of a frangible diaphragm. If so, the diaphragm is preferably a manufactured component that is provided to the operator during the use of the device for installation of an optical fibre unit. Where the diaphragm is not frangible, but merely moves in response to changes in air pressure within the device, the operator can reposition it to its original position for re-use.

In the embodiment shown in FIG. 3 the diaphragm 24 is held in place by a "snap-fit" retainer 40 and support ring 34, so that in an embodiment including a frangible diaphragm, the spent diaphragm may be removed and replaced by an operator. Removal of the ruptured diaphragm would allow the operator to access the reservoir 20 and refill it with index-matching fluid as required.

A frangible diaphragm would have the following properties: its periphery is preferably rigid where it connects to the housing 17 of the device 16. In addition its central portion is preferably made from a material capable of rupture when a pressure threshold is reached. Suitable materials to construct the central portion include plastic, paper, thin metal foil and the like. The particular choice of material ensures that the diaphragm 24 is capable of rupturing at an appropriate pressure, and it is suitably weather-proofed for use in outdoor operational conditions.

The embodiment shown in FIG. 4A and FIG. 4B can re-used and so is not meant to be disposable. The housing 17 of the device 16 is divided into two modules: a first module 44 containing the reservoir 20; and a second module 46 containing the diaphragm 24. The two modules may be connected together by, for example, a threaded portion (as shown), an interference fit, clips or the like. The diaphragm 24 in the second module 46, if frangible and ruptured, can be replaced after each use, otherwise it can be re-positioned for re-use, and the reservoir 20 re-filled with index-matching fluid as required. In the embodiment of the device shown in FIG. 4B, there is further included an exhaust conduit 60 through which the air can pass.

FIG. 4B is a view showing clearly the elements within the device. Here—as is the case for the disposable version of the device—the reservoir 20 is anchored 66 to the device, so that the reservoir is disposed in the centre of the device. The anchorage in this figure takes the form of wheel spokes between the reservoir and the inner wall of the device, but could take any suitable form. Essentially the means of anchorage allows the substantially unimpeded passage of air 64 around the reservoir, from the remote end of the conduit 8 and beyond, e.g. to the exhaust conduit 60. The air fed into the conduit at the head end thus travels through the length of the conduit, emerges at the remote end in the direction of the arrows 64, and exits unimpeded at the exhaust conduit.

Air Flow Detection—General

As noted above, the device can be used by the operator for two main purposes: to determine if air fed into the head end of the conduit is flowing to the correct remote end, as well as confirmation that the fibre unit has arrived at the remote end. The following concerns the first purpose of the exemplary embodiment.

When an air flow 12 is introduced into the conduit at the head end 6 at an air installation rate consistent with the air pressure applied by the compressor 14, air pressure rises within the conduit. Because the conduit 8 is connected to the device housing 17 with a diaphragm 24 defining the airtight space 21, the air is unable to escape from device at the remote end. Air gradually saturates the conduit and the device 16, and air pressure gradually equalises along the length of the conduit. As the air entering the conduit experiences an increasing resistance due to the increasing air pressure, the air flow 12 at the head end 6 gradually decreases. Because the housing 17 is connected to the conduit, the air pressure within the airtight space 21 is at this stage substantially the same as that within the conduit.

The diaphragm 24 within the housing is sensitive to pressure changes and configured to react when the air pressure within the space 21 reaches a threshold, e.g. when the pressure level within the space 21 is elevated relative to the pressure level in the region 23 beyond the diaphragm. The threshold at which the diaphragm 24 is designed to rupture is selected in accordance with the air pressure applied at the head end of the conduit 6 and the dimensions of the conduit. In a typical installation an air pressure of 10 bar may be applied at the head end, in which case the air pressure that builds up over time within the space 21 enclosed by the device 16 will also reach 10 bar. Preferably the diaphragm 24 is designed to rupture under pressure in the space 21 between 1 bar (ambient atmospheric pressure) and 10 bar, and preferably will rupture at a pressure slightly above 1 bar, for example 2 bar, to ensure that the rupture is gentle rather than explosive. The diaphragm is preferably configured to rupture in a manner which does not interfere with the operation of the device and the installation of the fibre e.g. so that the diaphragm remains substantially in single piece rather than many fragments, and where the single piece preferably remains attached at one or more points to the rigid perimeter of the diaphragm.

When the air pressure within the space 21 reaches the threshold at which the diaphragm 24 ruptures, the air pressure within the space rapidly falls to the ambient level. This reduces the resistance encountered by the air entering the conduit at the head end, in which case the air flow 12 into the conduit increases.

Air Flow Detection—Sensing Air Flow

In this aspect of the exemplary embodiment, an operator (not shown) at the head end location 2 monitors air flow movement levels and patterns within the conduit, to determine whether air introduced into the head end 6 is flowing to, and from, the correct remote end conduit. This is done by using an air flow sensor which is positioned preferably at the head end of the conduit. The air flow sensor 15 may be any air flow sensing means such as a known air flow gauge, and could preferably be integral with the air compressor 14.

According to the exemplary embodiment, an air flow pattern characterising the flow of air to the correct destination would be a gradual fall followed by a relatively rapid rise in air flow levels. If the air flow sensed by the air flow sensor 15 remains substantially constant and unvarying from the start, the operator may conclude that the air flow is unimpeded as no device 16 is connected to the conduit at the destination remote end, so that the air is flowing freely to another (unknown) destination. In this way, installation of a fibre unit into an incorrect conduit can be avoided.

The housing in this embodiment is shown in FIG. 1B to be open at end 13. This is not essential to the exemplary embodiment, as it could well be closed, as long as the diaphragm 24 continues to define the space 21 within the device. When air pressure levels within the space 21 reach the threshold level, the diaphragm moves e.g. by dislodgement, sliding or "popping", from a first position to a second position within the housing 17, e.g. along the direction of the air flow. This increases the space within the device which contains the air, in a relatively rapid fashion. Thus air flow levels initially fall, then rise relatively quickly all along the conduit, following the characteristic air flow pattern described above. This change can be detected at the remote end or any section along the length of the conduit, although preferably the operator at the head end location can do so using the air flow sensor 15.

The diaphragm movement can be slight (e.g. sufficiently only to permit air to flow into the enlarged space 21 so to signal the flow of the air to the correct remote conduit), or considerable (to the extent that a fibre unit can travel through the device past the moved diaphragm with minimal hindrance, where the end 13 is also sufficiently open).

A consequence of the reduction of air pressure at the remote end is that the air flow level at the head end which had gradually reduced prior the movement of the diaphragm, now increases to an equilibrium or steady-state level which represents a substantially unimpeded flow of air through the conduit (and the device) at the initial flow rate consistent with a typical air pressure level of e.g. 10 bar at the head end of the conduit.

In an alternative implementation, the diaphragm is frangible and configured to rupture as described above. The housing in this case can again be open or closed at end 13, and when the diaphragm ruptures, the characteristic air flow pattern can be detected along the conduit, again preferably at the head end location.

In a preferred implementation of the exemplary embodiment, the device end 13 is open. In such a case, air will flow through the conduit and out at the remote end upon rupture of the diaphragm. Flow levels then recover to an equilibrium or steady-state level which represents a substantially unimpeded flow of air through the conduit further air fed by the compressor into the conduit at the head end.

This exemplary embodiment of the invention advantageously permits the operator to continue the installation process by installing the fibre unit into the conduit, immediately after confirming that the air is flowing to the correct remote end. Other implementations of the invention would require the single operator to perform an additional step of removing the device from the remote end before he can continue to install the fibre unit. This may involve travel from the head end to the remote end. This is because the diaphragm would otherwise remain substantially in place to partly block the passage of air and more importantly, the progress of the fibre unit through the device. However, even such methods permit the single operator to work alone, unlike the prior art method where he would have need to be at two places at the same time.

The skilled person would also appreciate that it may be possible to connect the device to the conduit at points other than the mouth of the remote end of the conduit to realise the advantages and effects of the exemplary embodiment: the "sliding" or "popping" embodiment of the device could for example be connected to the conduit at any intermediate point—indeed, even at or proximate to the head end location. This however would require a separate and further step of sealing off of the remote end of the conduit. The activation of the diaphragm in the device may also be less conclusive proof that air is flowing from the desired remote end (e.g. in the event that air is fed down the wrong conduit and by coincidence the wrong conduit was also blocked for any reason).

The skilled person would also appreciate that it may be possible to connect the device to the conduit at points other than the mouth of the remote end of the conduit to realise the advantages and effects of the invention: the "sliding" or "popping" embodiment of the device could for example be connected to the conduit at any intermediate point—indeed, even at or proximate to the head end location. This however would require a separate and further step of sealing off of the remote end of the conduit. The activation of the diaphragm in the device may also be less conclusive proof that air is flowing from the desired remote end (e.g. in the event that air is fed down the wrong conduit and by coincidence the wrong conduit was also blocked for any reason).

Air Flow Detection—Sensing Air Pressure

The concept, embodiments and alternatives described above relating to the use of a diaphragm can also be used by an operator to achieve the same aim, by sensing changes in air pressure, instead of air flow.

The typical air pressure level pattern characterising the use of the invention is chiefly characterised by a rise (as air gradually saturates the conduit and the device), followed by a relatively rapid fall (as the diaphragm moves, ruptures, or displaces) in air pressure levels within the conduit. In the vast majority of blown fibre installations, air pressure level changes can be detectable substantially only within the space 21 in the device housing 17 so an air pressure sensor (which can be any conventional air pressure gauge) will in this embodiment be located in a manner permitting the pressure levels within the space 21 to be monitored, e.g. within or proximate to the device 16.

In the embodiment shown in FIG. 1B, the device is connected to the conduit at the remote end 16. As noted above, the pressure sensor is likely to be located near the remote end, so a method of conveying the change in pressure levels back to the operator at the head end would have to be included, e.g. by radio or other transmission upon the detection of the air pressure level change pattern discussed above.

As in the embodiment wherein air flows are monitored, it would also be within the scope of the invention to locate the device elsewhere along the conduit although again, the remote end of the conduit will have to be separately sealed off.

In the unusual situation where air pressure changes can be detected elsewhere within the conduit or otherwise, a pressure gauge could be positioned accordingly to monitor levels at that place.

Fibre Arrival Detection—Detection of Reflection

During installation of a fibre unit 10, light is introduced into the fibre unit 10 by a light source 30, which is preferably a laser, such as a semiconductor laser. The light can be continuous or arranged to be periodic (i.e. modulated) so as to be able to more easily distinguish it from any stray background light which may be present.

Optical fibres are typically made of glass, which have a larger refractive index than air. The ends of fibre units which are introduced into conduits are prepared with a cleaved surface. There is a characteristically strong reflection from such a cleaved surface. When it is exposed to air, the cleaved advancing end 28 of the fibre unit acts as a mirror to light propagating along the fibre unit 10 from the light source 30, so that while part of the light is transmitted onwards, a substantial portion of the light will be reflected back to the light source. The reflection can be detected by a light detector 32. The light detector 32 may be any type of light detection means, and preferably would employ semiconductor optical devices of the kind that are commonplace in the field of telecommunications and are complementary to the devices used in the light source 30. In its simplest form this could be an optical power measurement device (i.e. a optical power meter) of the kind that is commonly used by operators and field engineers during fibre installation procedures. At a more sophisticated level this could be, for example, an optical time domain reflectometer, which can detect, display, or indicate the presence of a reflection from the cleaved end.

When the advancing end 28 of the fibre unit arrives at the remote end of the conduit it enters the reservoir 20 so that it becomes immersed in the index-matching fluid 22. The index-matching fluid 22 is a fluid with a refractive index substantially equal to that of the fibre unit 10. Index-matching fluids suitable for use in this application are commonplace, examples of which include Norland index Matching Liquid type 150 from TechOptics, Visilox V-788 from Metrotek, and Nye SmartGel type OCF-446 from NyeOptical.

When the advancing end 28 of the fibre unit enters the index-matching fluid 22, its properties as a mirror are substantially reduced so that most light propagating through the fibre unit 10 is no longer reflected by the advancing end 28, but is instead propagated through the index-matching fluid 22 and dispersed. In this way, the amount of reflected light detected by the light detector 32 will substantially decrease when the advancing end 28 of the fibre unit becomes immersed in the index-matching fluid 22, and provides to the operator located at the head end, a positive indication that the fibre has arrived at its destination at the remote end of the conduit.

Advantageously, there is no need to employ a separate communication means, such as a radio transmitter, at the remote location 4 to alert the operator when the fibre unit 10 has arrived at the remote end. The fibre itself conveys that information to the operator at the head end 2, when the reflected light detected at the head end decreases. Expensive, delicate equipment, such as a radio transmitter, need not be left unattended at the remote location 4, thus completely obviating the need for a second operator at that location.

In response to confirmation that the advancing end 28 of the fibre unit has arrived at the device 16, the operator can manually turn off the blowing head and/or the air compressor to terminate the installation session. Termination can be automated by the use of a processor to recognise a characteristic fall in the level of detected light, and automatically stop the activity of the air compressor 14 and/or disengage the blowing head 3. The processor can be incorporated into the light detector 32. Another way to automate the process would be to use the blowing head of WO/9812588 discussed above, in conjunction with a device 16 having a closed end 13, or an intact diaphragm 24, or else including an open-ended device including a reservoir 20 having closed rear surface, so that the blowing head stops driving the fibre unit forward when the advancing end hits one of these obstacles.

The skilled person would recognise that alternatives within the scope of the invention are possible—for example the step of introducing light into the fibre and monitoring the fibre for reflected light could be carried out only when the fibre unit stops moving (when for example the advancing end of the fibre reaches a back wall e.g. in the form of the end cap 19 within the device of e.g. FIG. 2 or when the operator otherwise believes that the fibre unit has arrived at the far end. In such a case, the invention could be used to confirm fibre arrival at the remote end.

Fibre Arrival Detection—Fibre Bead

Figure 5:
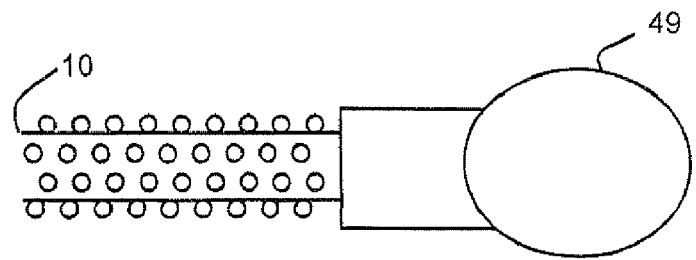
FIG. 5 depicts a bead of the prior art, used in conjunction with the installation of a optical fibre unit cable.

It is current practice to attach a "bead" 49 to the advancing end of a fibre, as depicted in FIG. 5. The purpose of the bead is mainly to protect the cleaved end of the fibre unit during installation. In particular, the fibre end is guarded from impact against the inner surface of the conduit; it may also suffer damage when it reaches a closed wall located at the remote end (e.g. in the form of an airstone coupled to the mouth of the remote end). The rounded tip of the bead also eases progress of the advancing end of the fibre along the conduit.

In further aspect of the invention, a bead 50 is further configured to be used in conjunction with the fibre detection method and apparatus of an embodiment of the present invention. In particular, the bead according to an embodiment of the invention protects the surface of the cleaved end 28 of the fibre to ensure that its surface remains clean during the installation procedure, and is fully exposed when the fibre unit reaches the index matching fluid, thus ensuring that the cleaved end is substantially in contact with the fluid.

Figure 6:
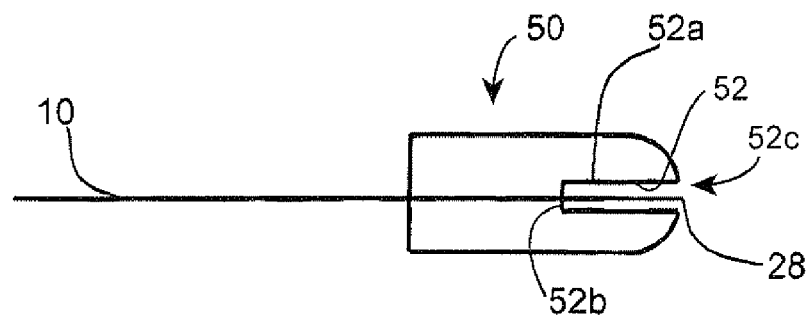
FIGS. 6 and 7 depict embodiments of beads in accordance with the invention.
Figure 7:
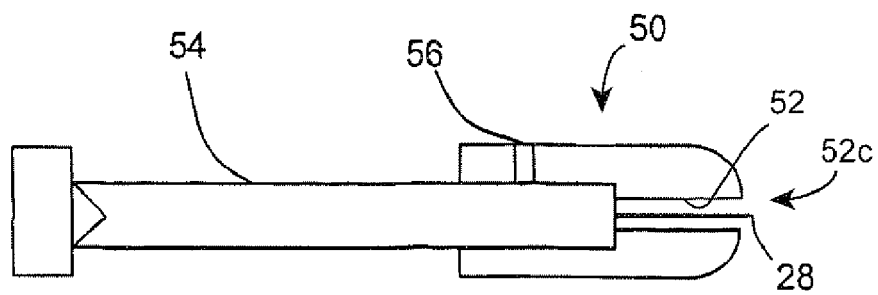

FIGS. 6 and 7 show a bead 50 attached directly to the cleaved end 28 of a fibre unit 10. The fibre unit in FIG. 6 is bare and has no outer protective coating. In FIG. 7 the fibre unit 10 is enclosed within an outer protective coating 54, which serves to protect and provide mechanical support for the fibre unit 10; the coating may also be designed to increase the viscous drag of the outer surface of the fibre unit to assist with the process of blowing the fibre along the conduit.

The beads in both cases are substantially identical, and may be fabricated from any suitable lightweight material, and preferably would be plastic or similar so that it may be attached to the fibre unit 10 or coating 54 of a fibre unit by adhesive, an interference fit or by other means. As noted above, it is substantially similar to current known beads, but has the following modifications.

The bead 50 in FIGS. 6 and 7 has a cylindrical chamber 52 defined by annular wall 52a and base wall 52b, and by opening 52c. Wall 52b additionally includes an opening (not shown) for receiving a fibre unit 10, or coating 54 of a fibre unit. Thus, the advancing end 28 of a fibre unit is prevented from impacting the sides of a conduit during installation. When a blown fibre unit 10 arrives at the remote end of a conduit and enters a reservoir 20, index-matching fluid 22 enters the chamber 52 via opening 52c, so that the advancing end 28 of the fibre unit becomes immersed in the index-matching fluid 22.

The bead 50 may be attached to the fibre unit 10 or coating 54 of a fibre unit by adhesive, interference fit or other means. Adhesive may be applied via a glue hole 56, as shown in FIG. 7. When the process of installing the fibre unit 10 in the conduit is complete, the bead 50 is removed or cut from the end of the fibre by a cable cutter or similar so that the end(s) of the fibre(s) can be prepared in the normal manner for connection to the network equipment.

The methods, devices and configurations described above and in the drawings are for ease of description only and not meant to restrict the invention to any particular embodiments. It will be apparent to the skilled person that various sequences and permutations on the methods and devices described are possible within the scope of this invention as disclosed; similarly the invention could be used in various similar scenarios and for various cable types. In particular, the apparatus and methods relating to air flow detection and the methods and apparatus relating to fibre arrival detection are depicted in this description to be used together in a preferred embodiment. However they will work independently of each other on their own, to realise the advantages of the respective inventions.

What is claimed is:

1. A method for use in connection with installing a fibre unit into a conduit having a first end and a second end, the method being suitable to detect when the fibre unit introduced into the first end arrives at the second end, and comprising:
   cleaving a fibre unit to create cleaved surface of the fibre unit configured for reflecting light along the fibre unit;
   introducing the fibre unit into the conduit from the first end and installing it towards the second end;
   introducing light with a light source into the fibre unit at the first end;
   reflecting light from said cleaved surface;
   detecting reflected light caused by reflection of the light from the cleaved surface of the fibre unit, with a light detector at the first end; and
   detecting changes in the reflected light, whereby an operator may determine that the fibre unit has arrived at the second end.

2. A method according to claim 1 wherein the steps of introducing light and detecting reflected light are carried out while the fibre unit is being installed from the first end to the second end.

3. A method according to claim 1, wherein the step of detecting changes in the reflected light comprises detecting when the amount of reflected light detected by the light detection means decreases.

4. A system for installing a fibre unit into a conduit having a first end and a second end, and being suitable to detect when the fibre unit introduced into the first end arrives at the second end, the system comprising:
   a light source for introducing light into the fibre unit;
   light dispersing means for dispersing light received via the fibre unit at or proximate to the second end,
   a cleaved end surface of the fibre unit configured to reflect light back along the fibre unit; and
   light detection means located at the first end to detect a change in light levels in the fibre unit resulting from a change in light reflected from the cleaved surface of the fibre unit.

5. A system according to claim 4, wherein the light dispersion means comprises a substance with a refractive index substantially similar to that of the fibre unit.

6. A system according to claim 5, wherein the substance is contained in a reservoir having an annular shape, positioned so that an end of the fibre unit may interact with the fluid therein.

7. A method for installing a fibre unit in a conduit having a first end and a second end, comprising:
   confirming whether air introduced into the conduit at the first end is flowing out of the conduit from the second end by substantially blocking the second end, so that when the air is introduced into the conduit its flow from the second end will be impeded;
   introducing a flow of air into the first end;
   confirming whether the air is flowing from the second end upon detection of changes in air flow levels within the conduit, and
   detecting the arrival of the fibre unit at the second end using a method according to claim 1.

8. A system for installing a fibre unit in a conduit having a first end and a second end, said system comprising:
   a light source for introducing light into the fibre unit;
   confirmation means for confirming whether air introduced into the conduit at the first end is flowing out of the conduit from the second end,
   wherein the device is connectable to the conduit, and wherein during use the air flows from the conduit into the device,
   the confirmation means comprising pressure sensitive means configured to respond to a change in air pressure levels,
   a cleaved end surface of the fibre unit configured to reflect light back along the fibre unit; and
   detection means for detecting the arrival of the fibre unit at the second end comprising light dispersing means for dispersing light received via the fibre unit at or proximate to the second end so as to permit detection at the first end of a change in light levels in the fibre unit resulting from a change in light reflected from the cleaved surface of the fibre unit.

9. A system for installing a fibre unit in a conduit having a first end and a second end, said system comprising:
   confirmation means for confirming whether an air flow introduced into the conduit at the first end is flowing out of the conduit from the second end, wherein the confirmation means is connectable to the conduit and comprises a device located at or proximate to the second end comprising pressure sensitive means configured to respond to a change in air pressure levels, and apparatus located at or proximate to the first end, comprising sensing means to detect changes in air flow levels and/or air pressure levels within the conduit, and detection means for detecting the arrival of the fibre unit at the second end comprising a means for coupling to the second end of a conduit into which a fibre unit having a cleaved surface for reflecting light along the fibre unit is to be installed, and a light dispersing structure which disburses light received via the fibre unit at or proximate to the second end.

10. A system according to claim 4, further including a bead attached to a fibre unit, said bead being for use in connection with installing a fibre unit into a conduit having a first end and a second end, and for use in conjunction with a light dispersing means for dispersing light received via the fibre unit at or proximate to the second end so as to permit detection at the first end of a change in light levels in the fibre unit resulting from a change in light reflected at said second end from a cleaved surface of the fibre unit, the bead comprising (a) a chamber into which the light dispersing means enters during use, and (b) a coaxially oppositely disposed opening to hold the cleaved end of the fibre unit in a position so that the cleaved end projects onto the chamber so that, during use, an advancing end of the fibre unit at said second end is immersed in the light dispersing means that has entered into the chamber.

* * * * *